United States Patent [19]

Lance et al.

[11] 4,018,135

[45] Apr. 19, 1977

[54] HYDRAULICALLY POWERED IMPACT DEVICE

[75] Inventors: Raymond E. Lance, Fort Worth; Ronald N. James, Arlington, both of Tex.

[73] Assignee: Construction Technology, Inc., Grand Prairie, Tex.

[22] Filed: Dec. 26, 1973

[21] Appl. No.: 428,093

[52] U.S. Cl. .................................. 91/321; 91/276; 92/134; 92/166; 92/85 B

[51] Int. Cl.$^{2}$ ..................... F01B 7/18; F01L 17/00; F16J 15/18

[58] Field of Search ................. 91/321, 341 R, 286, 91/235, 276, 165; 92/134

[56] References Cited

UNITED STATES PATENTS

| | | | |
|---|---|---|---|
| 2,445,985 | 7/1948 | Werner | 91/341 R |
| 3,007,452 | 11/1961 | Lee | 91/321 |
| 3,334,547 | 8/1967 | Grundmann | 91/321 |
| 3,411,592 | 11/1968 | Montabert | 91/321 |
| 3,524,385 | 8/1970 | Ottestad | 91/394 |
| 3,687,008 | 8/1972 | Densmore | 91/235 |
| 3,739,863 | 6/1973 | Wohlwend | 92/134 |
| 3,796,050 | 3/1974 | Fisk | 92/134 |
| 3,827,507 | 8/1974 | Lance | 91/276 |

*Primary Examiner*—Paul E. Maslousky
*Attorney, Agent, or Firm*—Hubbard, Thurman, Turner & Tucker

[57] ABSTRACT

A hydraulic impact device has a hammer member carrying a piston which is reciprocally disposed in a cylinder chamber to form an expansible chamber. When the expansible chamber is pressurized, the hammer is retracted against an air spring or other energy storage device by the high pressure. A sleeve valve is reciprocally disposed in the cylinder chamber between the piston and the energy storage device and is held against the piston by an imbalanced fluid pressure as the hammer is retracted against the spring. When the piston and sleeve valve have been retracted to a predetermined position, high pressure fluid is ported between the sleeve valve and piston to hydraulically separate the two members. The chamber pressure is then equalized on both sides of the piston at the return line pressure so that the air spring can accelerate the hammer to deliver an impact blow to an anvil and thence a tool with minimum resistance to movement of the piston by the hydraulic fluid as the chamber pressure is reduced to return line pressure. The sleeve valve is then again moved downwardly against the piston member by an imbalanced pressure condition. When the sleeve valve moves downwardly and seats against the piston, the piston and sleeve are again retracted by the high pressure and the cycle is repeated. The chamber wall is shaped to provide a hydraulic cushion for the hammer near the end of its impact stroke and to provide a seat for the piston apart from the sleeve valve so that high pressure fluid is bypassed to reservoir until a predetermined load is placed on the hammer.

14 Claims, 7 Drawing Figures

HYDRAULICALLY POWERED IMPACT DEVICE

This invention relates to hydraulically actuated, repetitive impact devices and more specifically relates to an impact hammer of the type used for demolition work.

Reciprocating tools for delivering high impact blows to demolish pavement, rock, and the like are well-known. These impact tools have heretofore been predominately driven by air pressure and are characterized by the well-known jackhammer. Large versions of the jackhammer have heretofore been mounted on the boom of a backhoe. These devices are characterized by being able to deliver relatively high frequency, but relatively low impact forces. As a result, even the larger of these devices tend to powder harder materials due to the relatively low force, although the high frequency to some extent compensates for this deficiency.

Some prior art systems, such as described in U.S. Pat. No. 3,687,008, disclose fluid controlled impact devices utilizing a reciprocating piston and sleeve valve. Such systems require at least three different pressures, one typically being atmospheric pressure, to shift the valve and thus provide reciprocation. The use of three pressures either significantly complicates the hydraulic system or the use of the atmosphere as the third pressure results in admission of dirt and impurities to the hydraulic system causing excessive wear and unsatisfactory performance. In addition, the prior art systems require seals on both the interior and exterior walls of the sleeve valve, complicating the manufacture and servicing of the device and materially reducing the useful life of the units.

The present invention relates to a hydraulic hammer which represents a significant advance in the state of the art. The device comprises a hammer having an integral piston disposed within a cylinder. The hammer is retractable against an air spring when high pressure hydraulic fluid is confined to one side of the piston. After retraction, the pressure is equalized at return pressure and the hammer is released for a downward impact stroke as the fluid freely bypasses the piston within the cylinder. A sleeve valve, axially slidable within the bore between the piston and the air spring, is automatically shifted by differential pressure to automatically cycle the hammer. During retraction of the hammer, the sleeve valve is seated against the piston by differential pressure to confine high pressure to one side of the piston and drive the piston against the air spring. The sleeve has a port communicating with a sealed control area at the end of the sleeve that is in contact with the piston. Once the hammer is retracted to store sufficient energy in the air spring, the port in the sleeve valve communicates with a high pressure port to hydraulically separate the valve and piston. The pressure on opposite sides of the piston is thereby equalized and the piston is driven freely through the hydraulic fluid by the air spring to produce an impact stroke with minimum loss of energy due to pumping fluid. Upon completion of the extension or impact stroke, the valve sleeve is again shifted into sealing contact with the piston by differential pressure to permit pressure fluid to build up behind the piston associated with the hammer so that the cycle is repeated.

A substantial increase in operating efficiency and speed is attainable with the device of the present invention in that hydraulic fluid is utilized only to retract the hammer to store energy in the spring. It is not necessary to divert high pressure fluid to the opposite side of the piston to drive the hammer through the impact stroke. Therefore, with a preselected pump delivery, the hammer can theoretically cycle at a rate approximately twice that of hammers requiring pressurization on both the retraction and extension or impact strokes.

The system of the present invention utilizes only the high pressure and return line pressure of a conventional hydraulic system to control the sequencing valve and to retract the hammer and piston. The sleeve valve is positioned above the piston so that the high speed downward movement of the piston during the impact stroke cannot damage the sleeve valve. The device is sealed from the atmosphere to maintain internal cleanliness. All annular sliding seals are on the exterior or end surfaces of the sleeve valve to simplify manufacture and provide a long operating life. The end of the cylinder bore is shaped to provide a hydraulic cushion for the piston near the end of the downward stroke and to separate the sleeve from the piston and thereby disable the system in the absence of a substantial upward load on the hammer as a safety feature.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
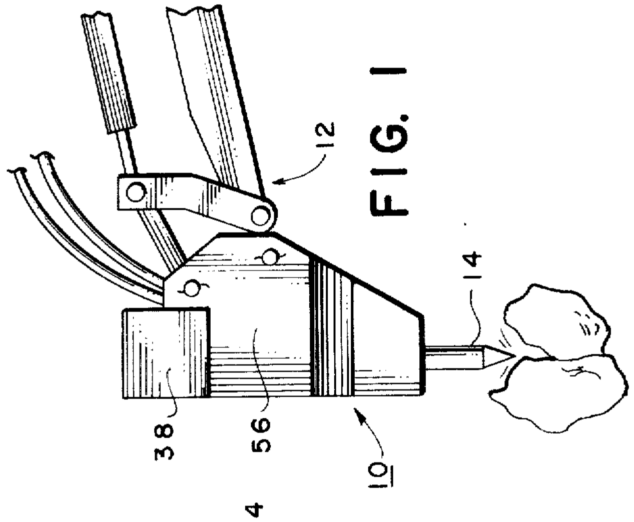
FIG. 1 is a side view showing the impact device of the present invention carried by the boom of a conventional backhoe.

Referring now to the drawings, a device in accordance with the present invention is indicated generally by the reference numeral 10 in FIG. 1. The device 10 is mounted on the end of a conventional backhoe boom 12 of a typical tractor unit, not shown. As is conventional with such machinery, boom 12 may be swung horizontally or vertically to position the device 10 either vertically or horizontally and press a chisel tool 14 against the work material, such as pavement, rocks, etc., with a substantial force, for example as much as 1,000 pounds.

Figure 2:
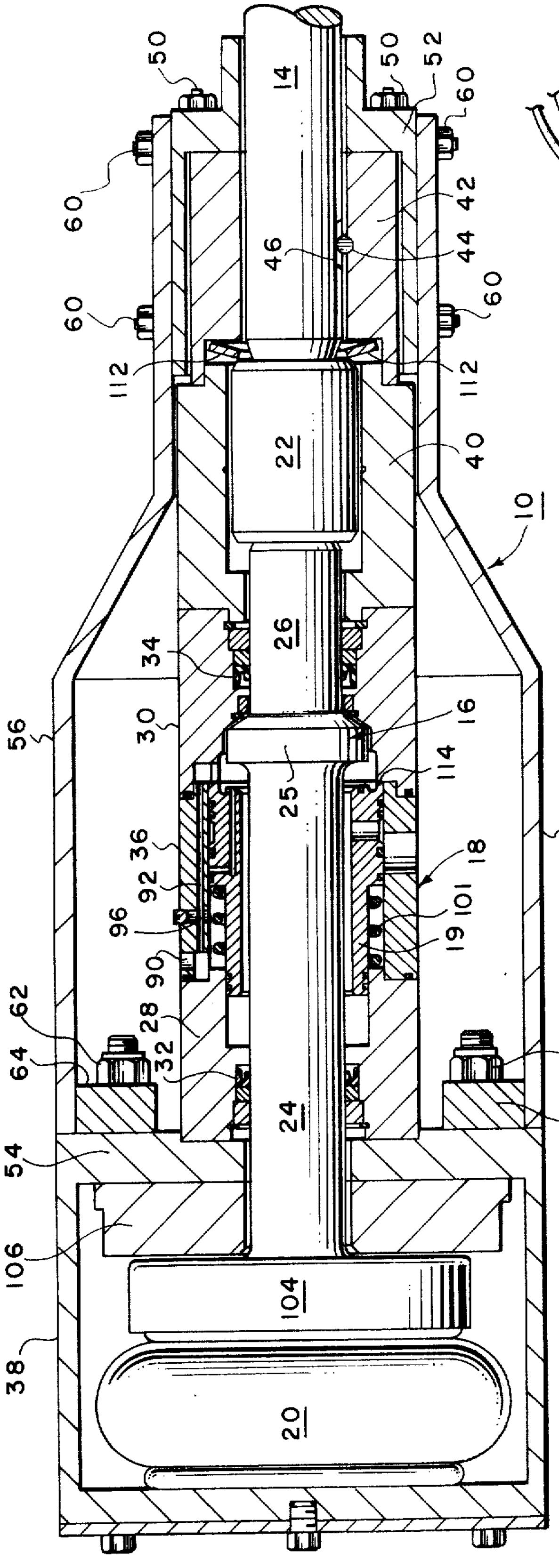
FIG. 2 is a longitudinal sectional view of the impact device of FIG. 1.

As can best be seen in FIG. 2, the tool 10 is generally comprised of a hammer member, indicated generally by the reference numeral 16, which is reciprocally disposed in a hydraulic cylinder, indicated generally by the reference numeral 18. A sleeve valve 19 is disposed within the cylinder and around the hammer member. As will presently be described, the hammer member 16 is moved upwardly against an air spring 20, or other suitable energy storage device, during a retraction stroke, and is driven downwardly by the energy storage means to impact an anvil 22 during a downward or impact stroke. The anvil 22 efficiently transfers the impact energy to the tool 14.

The hammer member 16 includes a piston portion 25 and upper and lower shaft portions 24 and 26, which are of the same diameter. The shaft portions 24 and 26 are slidably received in gland members 28 and 30, respectively, which include annular seals 32 and 34, respectively, of conventional design. The cylinder 18 is completed by a central port section 36 disposed between the gland members 28 and 30. The upper end of upper gland member 28 abutts a housing 38 for the air spring 20, and the lower gland member 30 abutts an anvil housing 40 which slidably receives the anvil 22. In turn, the anvil housing 40 abutts the tool housing 42 which slidably receives the tool 14. Tool 14 is retained by pin 44 extending through the tool housing and received in an elongated slot 46 in the tool 14.

The entire stack assembly, including the tool housing 42, anvil housing 40, lower gland member 28, port section 36, upper gland member 30, and the air spring housing 38 are held together by four bolts 50 (only two of which are shown in FIG. 2), which extend through a lower retainer member 52 and are threaded into the lower plate 54 of the air spring housing 38 to hold the members together. This structure is mounted to the backhoe boom 12 by side plates 56 and 58 which are connected at the lower ends to the member 52 by bolts 60 and at the upper ends by bolts 62 which pass through cleats 64 and are threaded into the lower plate 54.

Figure 3:
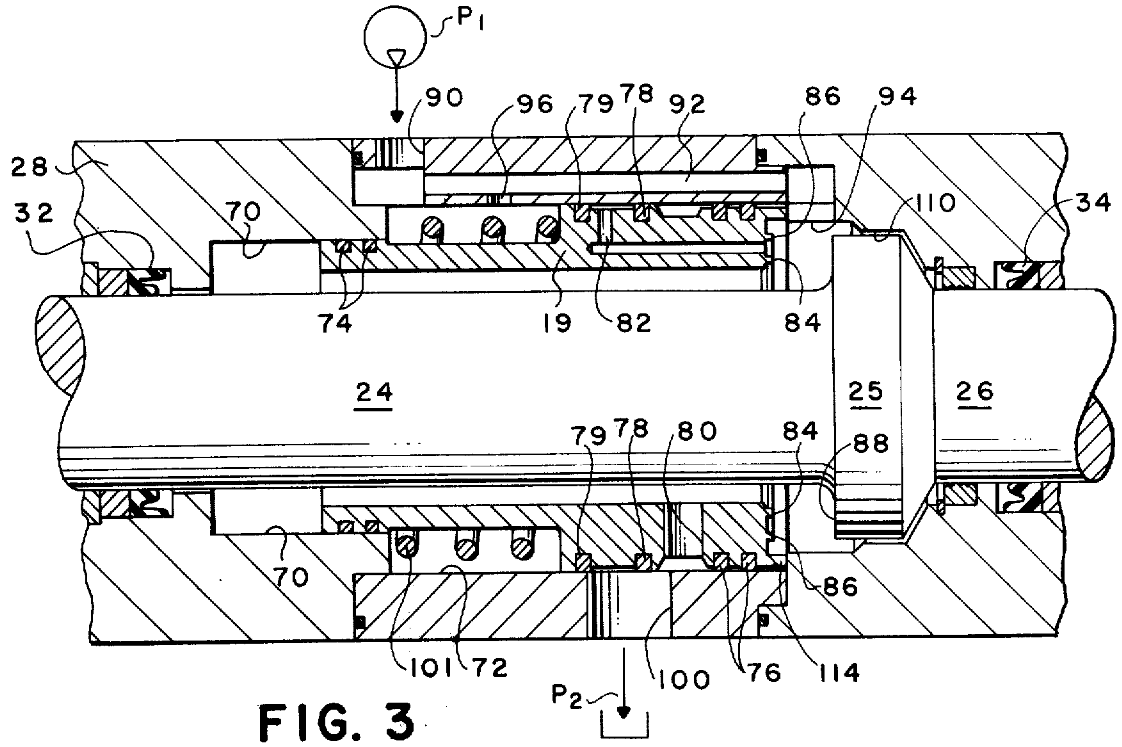
FIG. 3 is a simplified view of the hydraulic actuator portion of the impact device of FIG. 2, illustrating the piston in the non-loaded and thus inoperative position.

Referring now to FIG. 3, it will be noted that the upper gland member 28 has a bore 70 which is of smaller diameter than the bore 72 of the center port section 36. As can best be seen in FIG. 3, sleeve valve 19 has a pair of annular sealing rings 74 which slidably and sealingly engage the bore 70. A second pair of sealing rings 76 seal the annular space between the lower end of the sleeve valve 19 and the bore 72 of the center port section 36. Another sealing ring 78 is spaced on the opposite side of the low pressure port 80 from the sealing rings 76. Yet another annular seal 79 is spaced on the opposite side of a high pressure port 82. The port 88 extends to the lower end of the sleeve valve between two concentric lands 84 and 86 which seat against the port 88 of the piston portion 25, as will presently be described in greater detail. The concentric end lands can best be seen in FIG. 4.

High pressure fluid is passed to the interior of the center port section 36 by means of port 90 which is in continuous communication with the annular cavity formed between annular seal 79 and sealing ring 74. The port 90 is also in continuous communication with the bottom face of the piston portion 25 through a longitudinally extending bore 92 in the cylinder 36 and an annular cavity 94 formed in the lower gland member 30. High pressure fluid is also applied through a small port 96, which extends between bore 92 and the annular chamber formed between sealing rings 74 and 79, and then through pressure port 82 to the control area on the lower end of the sleeve valve between lands 84 and 86 when sealing ring 79 passes port 96. The port 96 is positioned such that it is in fluid communication with the space between sealing rings 78 and 79 when the sleeve valve 19 is at the top of the stroke. The low pressure port 80 is in continuous fluid communication with a low pressure or return port 100 in the center port section 36. In addition, the return port 100 is in fluid communication with the space between seal rings 78 and 79 when the valve sleeve 19 is at the bottom of its stroke as will presently be described. A coil spring 101 engages the upper gland member 28 and the sleeve valve 19 to bias the sleeve valve downwardly and thus increase the speed of operation, as will hereafter be described.

Returning once again to FIG. 2, the upper end of the upper shaft portion 24 of a hammer member abutts a plate 104 which is biased downwardly by the air spring 20. A suitable conventional resilient cushioning means such as illustrate in U.S. Pat. No. 3,866,690, issued to Raymond E. Lance, et al, and assigned to the assignee of the present invention, is indicated generally by the reference numeral 106 is provided to arrest travel of the plate 104 at the bottom of the stroke in order to preload the air spring and also protect the device from self-destruction in the event the impact energy produced by the spring driven hammer is not absorbed by the anvil 22 and tool 14 and the hydraulic cushion for the piston portion 25. The hydraulic cushion system is provided by annular cavity 94 and bore 110 in the lower gland member 30 into which the lower shaft portion 26 moves before the plate 104 contacts the resilient bumper 106. As the piston 25 enters the upper, larger annular cavity 94, some restraining force is applied to the piston. Then as the piston enters the smaller diameter bore 110, the close fit with the piston offers considerable resistance to outflow of the hydraulic fluid. This provides a very effective hydraulic cushion. Similarly, downward travel of the anvil 22 is cushioned by spring 112 in the event the tool 14 does not arrest its downward travel.

It will also be noted from FIG. 2 that the downward movement of the sleeve valve 19 is limited by an annular shoulder 114 which engages the upper end of the lower gland member 30. This prevents the lands on the sleeve valve from seating on the upper face 88 of the piston 25 until the hammer member has been moved upwardly by applying a load to the tool 14 and thus to the anvil 22 and hammer member 16. As will presently be described, this disables the device, as a safety precaution, except when the tool is properly loaded.

Figure 4:
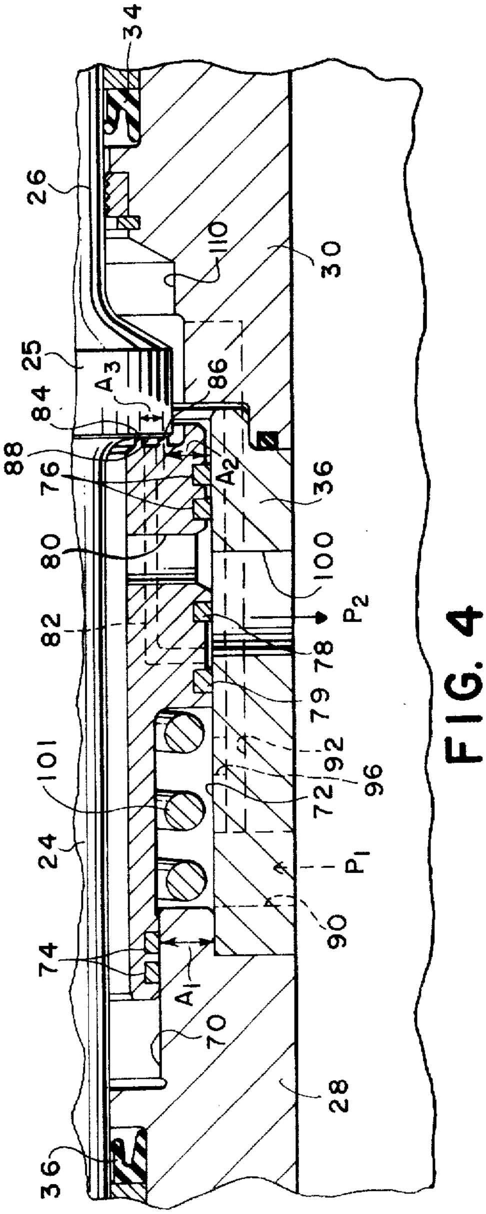
FIG. 4 is an enlarged representation of a portion of the valve sleeve with the high pressure porting system superimposed in dotted outline to facilitate an understanding of the operation of the device.

The details of construction of the sleeve valve 19 and the relationship of the hydraulic porting structure can best be seen from the enlarged and simplified view of FIG. 4. In FIG. 4, the high pressure porting shown in the opposite half of the structure in the smaller views has been superimposed in dotted outline on the low pressure ports in order to permit the enlarged view and, also, to better illustrate the operation of the system which will now be described.

FIG. 3 illustrates the position of the hammer member 16 when in its fully extended or lowermost position, which would be the position when the tool 14 is unloaded. In this position, hydraulic fluid enters through the high pressure port 90 and passes downwardly through bore 92 to the annular cavity 94, then between the sleeve valve 19 and the upper face 88 of the piston 25 and out through low pressure ports 80 and 100 to return to tank. It is understood that the return pressure $P_2$ is at some pressure above atmospheric as is customary in the operation of hydraulic systems.

Figure 5:
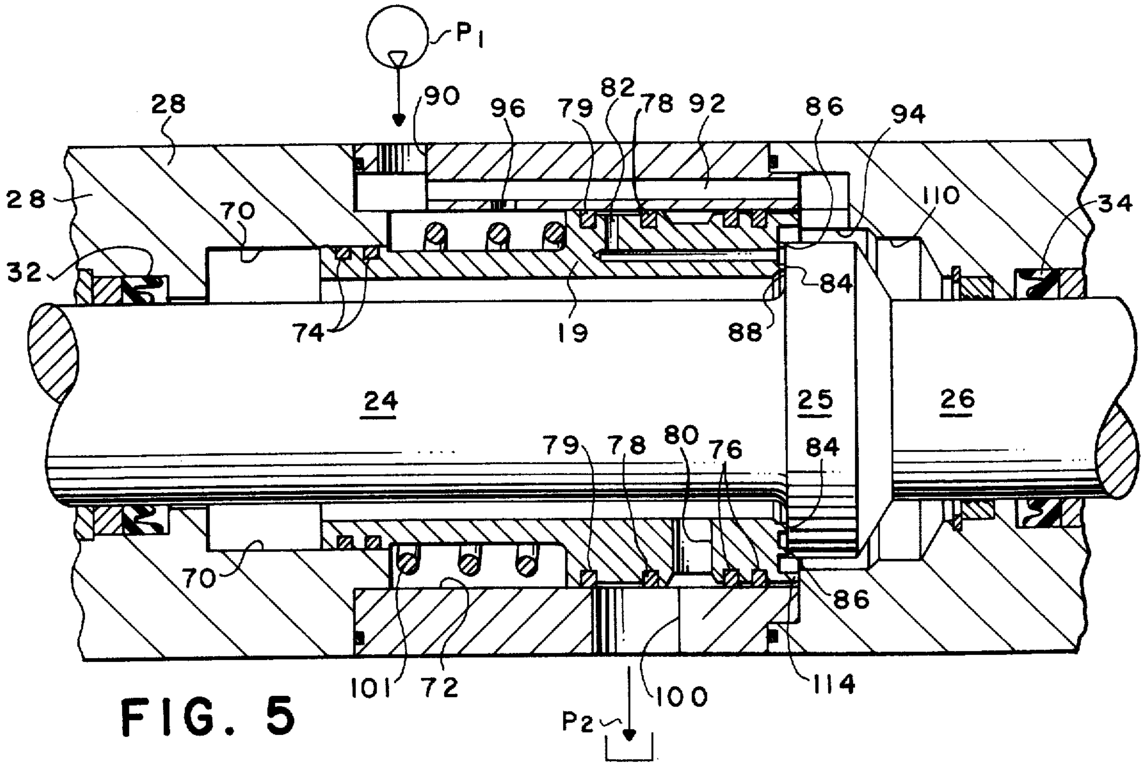
FIG. 5 is a simplified sectional view similar to FIG. 3 illustrating the position of the piston and valve sleeve at the beginning of the retraction stroke.

When the tool 14 is pressed against a work material, such as concrete or other material to be broken, with sufficient force to move the hammer member 16 upwardly until the upper face of the piston 25 engages the valve sleeve 19 as illustrated in FIGS. 4 and 5, the device begins to function in the hammer mode. When the piston 25 seats against the concentric lands 84 and 86 of the sleeve valve 19, high pressure fluid is held between sealing rings 76 and concentric land 86 and sealing rings 79 and 74. Since control port 82 is in communication with the low pressure port 100 until the ring 79 passes port 96, the sleeve valve 19 is subjected to low pressure fluid from land 86 around the interior face of the sleeve to the sealing rings 74. High pressure fluid is continually applied between annular seal 79 and sealing rings 74 on the outside of the sleeve valve 19. The diameter of the outer concentric land 86 is slightly greater than the diameter of the bore 70 so that the area $A_2$ (see FIG. 4) is slightly less than the area $A_1$. This difference in area is sufficient for the high pressure acting on the area $A_1$ to overcome the high pressure acting on the area $A_2$ plus the low pressure acting on an area equal to $A_1$ less area $A_2$. As a result, the sleeve valve 19 is held in contact with the upper surface of the piston 27.

However, the high pressure acting on the bottom face of the piston 25 is adequate to force both the piston 25 and sleeve valve 19 upwardly to compress the air spring 20 because the net downward force holding the sleeve against the piston is negligible compared to the net upward force tending to move the piston against the air spring 20. Thus, the piston is moved upwardly at a rate determined by the rate fluid passes through bore 92 to the annular cavity 94 from the hydraulic source and from the regenerative effect from above the valve sleeve.

Figure 6:
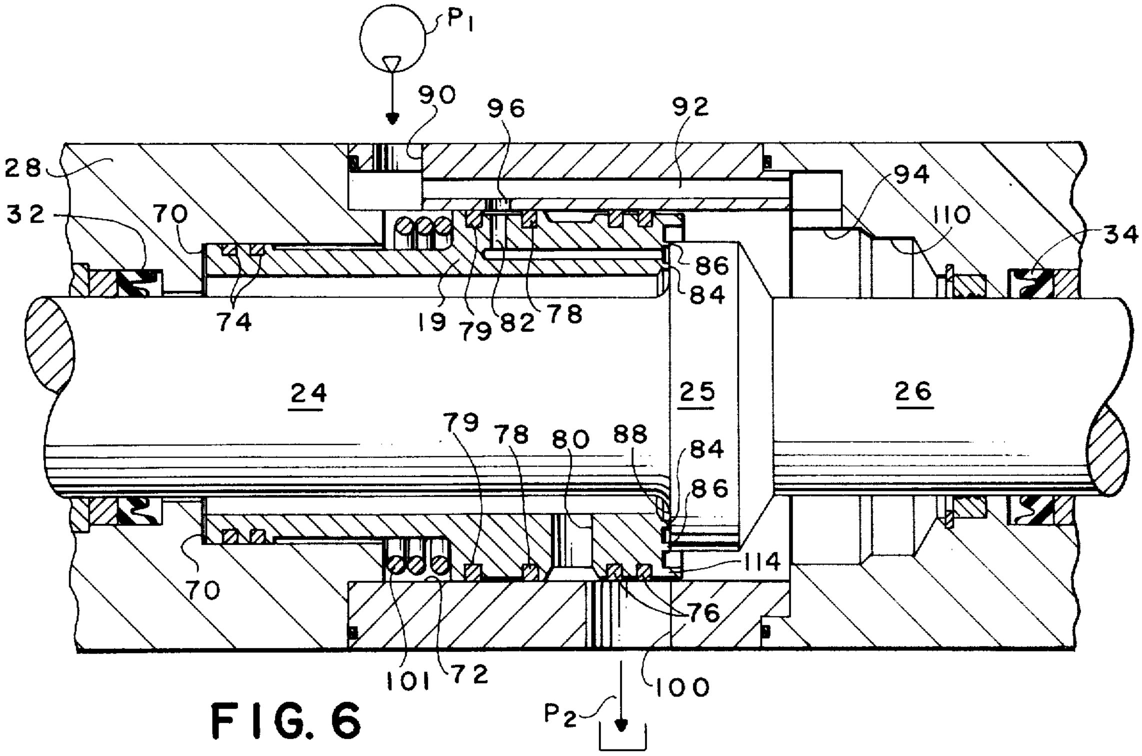
FIG. 6 is a simplified sectional view similar to FIG. 3 illustrting the piston and valve sleeve at the beginning of the impact stroke.
Figure 7:
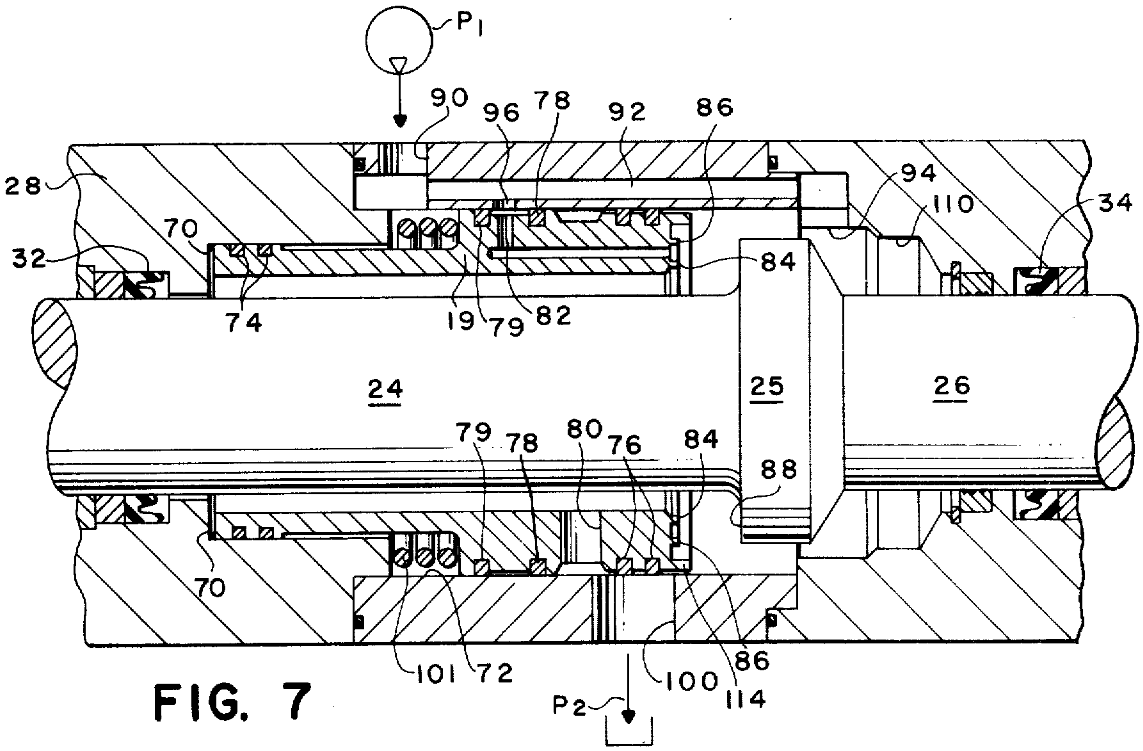
FIG. 7 is a simplified sectional view similar to FIG. 3 showing the piston at the end of the impact stroke.

When the valve sleeve 19 and hammer member 16 reach the position where the annular seal 79 has passed high pressure port 96, as illustrated generally in FIG. 6, high pressure fluid is ported to the control area $A_3$ between concentric lands 84 and 86. As a result of the high pressure fluid applied to both areas $A_2$ and $A_3$, which combined are greater than the area $A_1$, the sleeve valve 19 separates from the upper face of the piston 25. As soon as the sleeve valve 19 separates from the piston 25, the energy stored in the air spring 20 accelerates the piston to a high speed until the hammer impacts the anvil 22. The hydraulic fluid bypasses the piston during the impact stroke and offers substantially no resistance, unless the piston enters the hydraulic cushioning chamber. Since no fluid is displaced during the impact stroke of the piston 25, no fluid need be pumped into the chamber for this purpose.

As soon as the piston 25 is separated from the sleeve valve 19, the pressure acting on the area $A_1$ is greater than the pressure acting on the lower end of the sleeve valve 19 as a result of the pressure drop through the bore 92. This differential in pressure is sufficient to move the sleeve valve downwardly to again contact the piston 25, at which time the pressure acting on area $A_1$ again becomes a maximum. However, the coil spring 101 is provided to initially accelerate the sleeve valve when the hydraulic force is the least in order to speed up the frequency of reciprocation of the system. Assuming that the anvil arrests the downward movement of the hammer at a position such that the sleeve valve can still contact the upper face of the piston, the stroke is immediately repeated when the lands 84 and 86 seat on the upper surface of the piston 25. At this time it will be noted that the control area $A_3$ is in communication with the low pressure port.

From the above detailed description of a preferred embodiment of the invention, it will be appreciated by those skilled in the art that an impact device has been described which is relatively simply and thus relatively inexpensive to manufacture, yet which has a long service life because of unique design features. The device is operated by a conventional hydraulic system, yet is completely sealed from the atmosphere to prevent contamination. This is made possible by reason of the fact that the sleeve valve is shifted using only two different pressures. The sleeve valve has only external sealing surfaces, thus simplifying its fabrication and increasing its service life. Since the sleeve valve is separated from the piston at the top of the stroke by hydraulic rather than mechanical means, no wear results from mechanical bumping. By merely limiting the downward movement of the sleeve valve more than that of the piston, the system can be disabled for safety reasons until the tool is preloaded. This system requires no additional valve system for bypassing high pressure fluid to disable the device until preloaded. The hydraulic cushion system at the lower end of travel of the piston prevents self-destruction due to overtravel of the piston.

Although a preferred embodiment of the invention has been described in detail, it is to be understood that various changes, substitutions and alterations can be made therein without departing from the spirit and scope of the invention as defined by the appended claims.

What is claimed is:

1. A hydraulic impact device comprising a cylinder member having a lower gland portion, a center portion having a stepped bore with an upper section having a diameter less than a lower section, and an upper gland portion, a hammer member reciprocally disposed in the cylinder having lower and upper shaft portions slidably and sealingly received in the lower and upper gland portions, respectively, and a piston portion disposed generally in the center portion, the piston portion having a diameter less than the maximum diameter of the stepped bore to permit fluid to bypass the piston within the bore and permit the hammer member to be driven downwardly by an external biasing force, a sleeve valve reciprocally disposed within the cylinder member around the upper shaft portion, the sleeve valve having a first peripheral seal with the upper section of the stepped bore and a second peripheral seal with the lower section of the stepped bore to form an annular cavity between the first and second peripheral seals, the sleeve valve and the cylinder member, and a first annular portion on said sleeve valve forming a seal with the upper face of the piston section, the effective diameter of the first annular seal being less than the diameter of the lower section of the stepped bore and greater than the diameter of the upper section of the stepped bore, high pressure port means continually communicating with the interior of the cylinder below the second peripheral seal and with the annular cavity formed by the first and second peripheral seal means, the sleeve valve, and the clyinder member, low pressure port means communicating with the interior of the sleeve valve between the first peripheral seal and the first annular seal, and means for separating the sleeve valve from the piston portion at the top of the stroke of the piston to break the first annular seal and bypass fluid around the piston portion and within the bore to allow the piston portion to be driven downwardly by the external biasing force applied to the hammer member.

2. The hydraulic impact device of claim 1 wherein the means for separating the sleeve valve from the piston portion comprises means for reversing the balance of hydraulic forces acting on the sleeve valve.

3. The hydraulic impact device of claim 1 wherein the high pressure port means includes a more restrictive path for fluid going to the interior of the cylinder than to the annular cavity.

4. The hydraulic impact device of claim 1 further characterized by spring means for at least initiating the return of the sleeve valve to the piston portion after separation from the piston portion.

5. The hydraulic impact device of claim 1 wherein the high pressure port means includes a more restrictive path for fluid going to the interior of the cylinder than to the annular cavity, and further characterized by spring means for at least initiating the return of the sleeve valve to the piston portion after separation from the piston portion.

6. The hydraulic impact device of claim 1 further characterized by means for limiting the downward movement of the sleeve valve to a greater extent than the downward movement of the piston portion to disable the operation of the device until the piston member is moved upwardly to contact the sleeve valve.

7. A hydraulic impact device comprising a cylinder having lower and upper gland portions defining the ends of a cylinder bore, a hammer member reciprocally disposed in the cylinder bore having lower and upper rod portions sealingly received in the lower and upper gland portions respectively and including a piston portion disposed in the cylinder bore having a diameter significantly less than that of the cylinder bore to permit fluid to bypass the piston within the cylinder, a sleeve valve reciprocally disposed in the cylinder bore above the piston portion for sealingly engaging the upper surface of the piston portion and dividing the cylinder bore into a lower high pressure chamber and an upper low pressure chamber, hydraulic port means for applying high pressure fluid to the high pressure chamber and for exhausting fluid from the low pressure chamber, the sleeve valve being totally exposed only to said high pressure fluid and exhaust pressure fluid and having effective hydraulic areas exposed only to said high pressure and said low pressure such that hydraulic fluid continually biases the sleeve valve toward the piston portion to tend to maintain sealing engagement between the sleeve valve and the piston portion to thereby divide the cylinder into high and low pressure chambers, means for separating the sleeve valve from the piston portion when the sleeve valve has reached a predetermined position of its stroke toward the upper gland to allow high pressure fluid to bypass the piston within the cylinder from the high pressure chamber to the low pressure chamber, energy storage means engaging one of the rod portions which is charged with energy by upward movement of the hammer member for rapidly driving the hammer member downwardly when the sleeve valve is separated from the piston portion to allow high pressure fluid in the high pressure chamber to bypass the piston to the low pressure chamber.

8. The hydraulic impact device of claim 7 wherein the means for separating the sleeve valve from the piston comprises hydraulic port means for reversing the net effect of the hydraulic forces acting to bias the sleeve valve against the piston portion.

9. The hydraulic impact device of claim 7 further characterized by a sealed control chamber formed between the sleeve valve and the piston portion when the sleeve valve engages the piston portion and hydraulic port means for applying fluid at exhaust pressure to the control chamber until the sleeve valve reaches te predetermined position and then applying a high pressure fluid to separate the sleeve valve from the piston portion.

10. The hydraulic impact device of claim 7 wherein the sleeve valve is at least partially biased toward the piston by spring means.

11. The hydraulic impact device of claim 7 including a cushion chamber closely receiving an annular projection on the hammer means to partially trap hydraulic fluid to hydraulically decelerate the hammer at the end of the downward stroke.

12. The hydraulic impact device of claim 11 wherein the annular projection is the piston portion.

13. A hydraulic impact device comprising a cylinder member having a lower gland portion, a center portion having a stepped bore with an upper section having a diameter less than a lower section, and an upper gland portion, a hammer member reciprocally disposed in the cylinder having lower and upper shaft portions slidably and sealingly received in the lower and upper gland portions, respectively, and a piston portion disposed generally in the center portion, the piston portion having a diameter less than the maximum diameter of the stepped bore to permit fluid to bypass the piston within the bore and permit the hammer member to be driven downwardly by an external biasing force, a sleeve valve reciprocally disposed within the cylinder member around the upper shaft portion, the sleeve valve having a first peripheral seal with the upper section of the stepped bore and a second peripheral seal with the lower section of the stepped bore to form an annular cavity between the first and second peripheral seals, the sleeve valve and the cylinder member, and a first annular seal with the upper face of the piston section, the effective diameter of the first annular seal being less than the diameter of the lower section of the stepped bore and greater than the diameter of the upper section of the stepped bore, high pressure port means continually communicating with the interior of the cylinder below the second peripheral seal and with the annular cavity formed by the first and second peripheral seal means, the sleeve valve, and the cylinder member, low pressure port means communicating with the interior of the sleeve valve between the first peripheral seal and the first annular seal, and means for reversing the balance of hydraulic forces acting on the sleeve valve for separating the sleeve valve from the piston portion at the top of the stroke of the piston to break the first annular seal and bypass fluid around the piston portion and within the bore to allow the piston portion to be driven downwardly by the external biasing force applied to the piston, said means comprising a second annular seal formed on the lower face of the sleeve valve for sealingly engaging the piston portion when the first annular seal is formed, and having an effective diameter less than the diameter of the upper stepped portion to form a control chamber between the first and second annular seals, and port means for directing high pressure fluid to the control chamber when the piston and sleeve valve have reached the top of the stroke to change the balance of hydraulic forces acting on the sleeve valve and move the sleeve valve away from the piston portion.

14. A hydraulic impact device comprising a cylinder having lower and upper gland portions defining the ends of a cylinder bore, a hammer member reciprocally disposed in the cylinder bore having lower and upper rod portions sealingly received in the lower and upper gland portions respectively and including a piston portion disposed in the cylinder bore having a diameter significantly less than that of the cylinder bore to permit fluid to bypass the piston within the cylinder, a sleeve valve reciprocally disposed in the cylinder bore above the piston portion for sealingly engaging the upper surface of the piston portion and dividing the cylinder bore into a lower high pressure chamber and an upper low pressure chamber, hydraulic port means for aplying high pressure fluid to the high pressure chamber and for exhausting fluid from the low pressure chamber, the sleeve valve being totally exposed to either high pressure fluid or exhaust pressure fluid and having effective hydraulic areas proportioned such that hydraulic fluid continually biases the sleeve valve toward the piston portion to tend to maintain sealing engagement between the sleeve valve and the piston portion to thereby divide the cylinder into high and low pressure chambers, means for separating the sleeve valve from the piston portion when the sleeve valve has reached a predetermined position of its stroke toward the upper gland to allow high pressure fluid to bypass the piston within the cylinder from the high pressure chamber to the low pressure chamber, energy storage means engaging one of the rod portions which is charged with energy by upward movement of the hammer member for rapidly driving the hammer member downwardly when the sleeve valve is separated from the piston portion to allow high pressure fluid in the high pressure chamber to bypass the piston to the low pressure chamber, and means for limiting the movement of the sleeve valve toward the lower gland portion at a point such that the valve member cannot engage with the piston portion until the hammer member has been moved upwardly a distance.

* * * * *